United States Patent

Bonander et al.

[11] Patent Number: 5,785,636
[45] Date of Patent: Jul. 28, 1998

[54] COMPOSITE ROLL SHELL

[75] Inventors: James Bonander, Clarks Summit, Pa.; Richard Russell Hergert, Rockton, Ill.; Gregory Lynn Wedel, Beloit, Wis.

[73] Assignee: Beloit Technologies, Inc., Wilmington, Del.

[21] Appl. No.: 542,368

[22] Filed: Oct. 12, 1995

[51] Int. Cl.$^6$ ............................................. B23P 15/00
[52] U.S. Cl. .................................... 492/7; 492/20
[58] Field of Search .................. 492/7, 20; 100/162 B; 162/358

[56] References Cited

U.S. PATENT DOCUMENTS

| | | |
|---|---|---|
| 3,757,398 | 9/1973 | Urban ............................... 492/7 |
| 3,783,481 | 1/1974 | Gallat .............................. 492/7 |
| 4,058,877 | 11/1977 | Lehmann ......................... 492/7 |
| 4,156,958 | 6/1979 | Miesch ............................ 492/7 |
| 4,249,290 | 2/1981 | Lehmann ......................... 492/7 |
| 4,368,568 | 1/1983 | Watanabe . |
| 4,571,798 | 2/1986 | Adams . |
| 4,586,224 | 5/1986 | Sartor et al. . |
| 4,951,392 | 8/1990 | Miihkinen . |
| 4,962,578 | 10/1990 | Saito et al. . |
| 4,989,306 | 2/1991 | Lieno et al. . |
| 5,091,027 | 2/1992 | Watanabe . |
| 5,142,759 | 9/1992 | Bonander et al. . |
| 5,257,966 | 11/1993 | Watanabe et al. . |
| 5,334,124 | 8/1994 | Ohno . |

OTHER PUBLICATIONS

Mallick, P.K., *Fiber–Reinforced Composites: Materials, Manufacturing, and Design*; Applicants only have a single copy of this copyrighted book, so no copy is available to provide to the U.S. Patent and Trademark Office. pp. 1–6, 15–21 and 37–56. Copyright 1988 by Marcel Dekker, Inc., N.Y., N.Y.

*Primary Examiner*—Irene Cuda
*Attorney, Agent, or Firm*—Hill, Steadman & Simpson

[57] ABSTRACT

A controlled deflection roll for forming a press with an opposed roll including an elongate tubular roll shell, an elongate support shaft extending longitudinally through the roll shell, and a fluid operated controllable load support means between the shaft and the shell, such as a piston with an open pressure hydrostatic oil interface facing the shell. The roll shell is constructed of a fabricated fiber reinforced matrix, and is comprised of a plurality of annular layers of fiber and matrix composite, so that the shell is of relatively light weight and has a reduced cross-machine bending stiffness.

12 Claims, 2 Drawing Sheets

COMPOSITE ROLL SHELL

BACKGROUND OF THE INVENTION

The invention relates to controlled deflection rolls of the type used in a papermaking machine press for forming a press nip with an opposed roll.

In a conventional press of the type used in a papermaking machine for dewatering a traveling web, two or more press rolls are pressed together with the requirement that they produce a substantially uniform line of nip load across the length of their contact.

The line load, also referred to as nip pressure, is generally measured in pounds per inch of width and will not be entirely uniform with plain rolls due to differences in the deflection of the rolls under different applied loads. Plain press rolls can be contoured or crowned to compensate for the deflection at a specific load, but the resulting nip pressure will not be uniform along the nip for other loadings.

A solution to this problem for obtaining uniform nip pressure at varying nip loads is the use of controlled deflection rolls. Sometimes, this type of roll is referred to as a controlled crown, or CC, roll. In these rolls, the nip pressure profile can be adjusted by increasing or decreasing the pressure applied to the shell from inside the roll. The structure of such a roll involves a roll shell supported on a central shaft extending co-axially therethrough with a fluid-controllable, load-supporting means between the shaft and the roll shell opposite the nip line. Various nip-loading devices have been employed for loading the nip by transferring the forces to the inner surface of the roll shell from the shaft. These arrangements provide for loading the nip and, in certain circumstances, for controlling the load along the length of the nip so that an adjustable crown can be obtained, that is, either a uniform nip or a controlled nip. In one form, the support pressure applied to the nip is accomplished by an oil lubricated shoe wherein the pressure of the oil and the force on the shoe opposite the nip can be controlled or adjusted. With this type of construction, the shell is typically formed of heavy cast metal and machined to the required dimensions and surface smoothness inside and out.

The amount of mass which makes up the complete controlled deflection roll, including the cast roll shell, shoe and shaft plus the loading arms, influences nip vibration. In some constructions, the roll shell is covered with a synthetic cover, and these vibrations will cause corrugations in the roll cover, as well as in the felt which is passed through the nip with the web. Most corrugation and roll bouncing problems are related to the recovery time of the roll cover elastomer.

One partial solution to the problem is to mount anti-friction bearings, which support the roll shell, to a carrier ring which is slidably or pivotally mounted to the center shaft. The nip loading shoe is then used to raise the roll shell into contact with the mating roll. Such a construction reduces the total vibrating weight, but it also lowers the natural frequency of the roll, which is undesirable.

The nip-loading shoe has been used to raise the shell into contact with the mating roll and, in this arrangement, the center shaft and mounting do not participate in nip vibrations because they are not mechanically linked with the roll shell when the roll shell is moved radially in the direction of the nip. This reduces the inertial mass load on the press nip. Because the bearings are mounted on a movable carrier, or bearing ring, and are, therefore, not directly supported on the center shaft, opposing end shoes must be added to reduce the bending moment needed to change the contour of the nip profile. These counter-shoes add additional rotational resistance to the shell. Because the shoes are located closer to the roll center than the rotational bearings in a conventional controlled crown roll, the bending moment is reduced, thus limiting the crown control. Further, the massive shell is still able to cause some damage to the felts and to roll covers due to its own mass, which affects nip loads during nip vibrations.

It is accordingly an object of the invention to provide an improved controlled crown roll structure which avoids disadvantages of structures heretofore available.

A further object of the invention is to provide an improved roll shell for a controlled crown roll construction wherein the mass is greatly reduced to reduce the problems of nip vibrations and other consequent disadvantages of operation.

A still further object of the invention is to provide an improved controlled crown roll with a unique shell construction wherein the shell weight will be substantially less than with conventional cast metal shells and wherein the shell thickness is reduced and cross-machine stiffness reduced.

FEATURES OF THE INVENTION

In accordance with the principles of the invention, a controlled crown roll is provided with a center shaft and supporting liquid pressure crown control supports, such as hydraulically actuated shoes. The roll shell is formed of a fiber-reinforced resin. The shell, in the construction provided, will have about 20% of the weight of a conventional cast metal shell of the same dimensions and can be less than about 10% of the weight of a conventional cast metal roll shell if the shell thickness is reduced. The reduced thickness is possible because the shell stresses are predominantly compressive stresses. The reduced mass will greatly reduce the potential for the press nip to damage felts and roll covers.

The roll shell is comprised of inner, intermediate and outer layers. Each layer is formed of a composite of a matrix and fibers. The matrix is a chemically inert, glue-like structure which holds the fibers together in a desired location and orientation, and transfers the load from fiber to fiber. The matrix also protects the fibers from damage due to elevated temperatures and humidity.

Regarding the three layers, the inner layer is comprised of high abrasion resistant fiber, preferably randomly orientated, and a high temperature resistant, fluid impermeable matrix. The inner surface of the inner layer is comprised mostly, or entirely, of matrix so as to better protect and support the fibers from loss of lubrication, liquids, such as oil contaminants, stress and shear.

The intermediate layer has its fibers oriented to be aligned substantially circumferentially to provide maximum hoop strength.

The outer layer is a composite comprised of a matrix in which fibers are randomly oriented. Examples of the preferred matrix, particularly for the outer layer, are epoxy, polyester, phenolics, polyamids, and bisnalaimides. Preferred fibers for the outer layer include aramids, ceramic, glass, graphite, para-aramids and meta-aramids.

The matrix is selected for high impact strength and fracture resistance. This guards against the potential of the roll's surface being either dented or shattered, both of which would be deleterious to the roll's operation in a papermaking machine.

Examples of preferred, high strength and modulus, high abrasion resistance fiber include aramids, ceramic, glass, graphite, para- and meta-aramids. Examples of preferred impermeable, high temperature matrices include toughened epoxies, urethane, thermoplastic, PEEK (Poly Ether Ether Ketone), PPS (Poly Phenylene Sulfide) and nylon, for example. Such high strength and abrasion resistant fibers and high temperature, impermeable matrices are preferred for use in the inner layer where sliding friction with the hydraulically actuated shoes, and exposure to hydraulic oil contaminants, would be expected to be encountered during operation.

Other objects, advantages and features will become more apparent, as will equivalent structures which are intended to be covered herein, with the teaching of the principles of the invention in connection with the disclosure of the preferred embodiments thereof in the specification, claims and drawings, in which:

DESCRIPTION OF THE PREFERRED EMBODIMENTS

Figure 1:
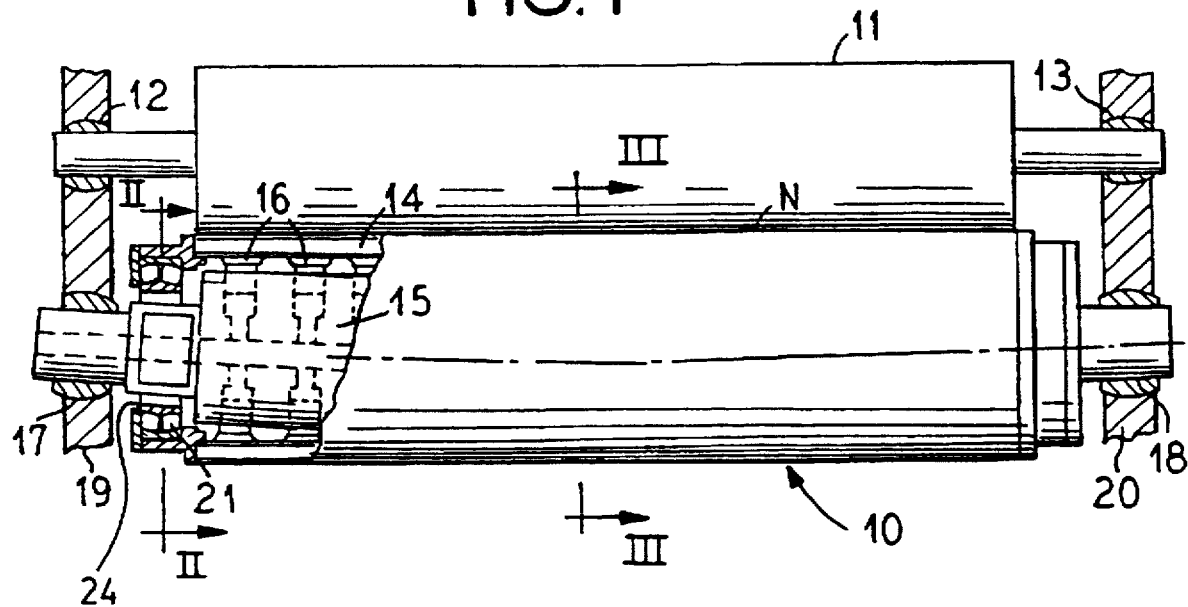
FIG. 1 is a side-elevational view, partially in section,. of a controlled crown roll with a mating roll forming a press nip therebetween.
Figure 2:
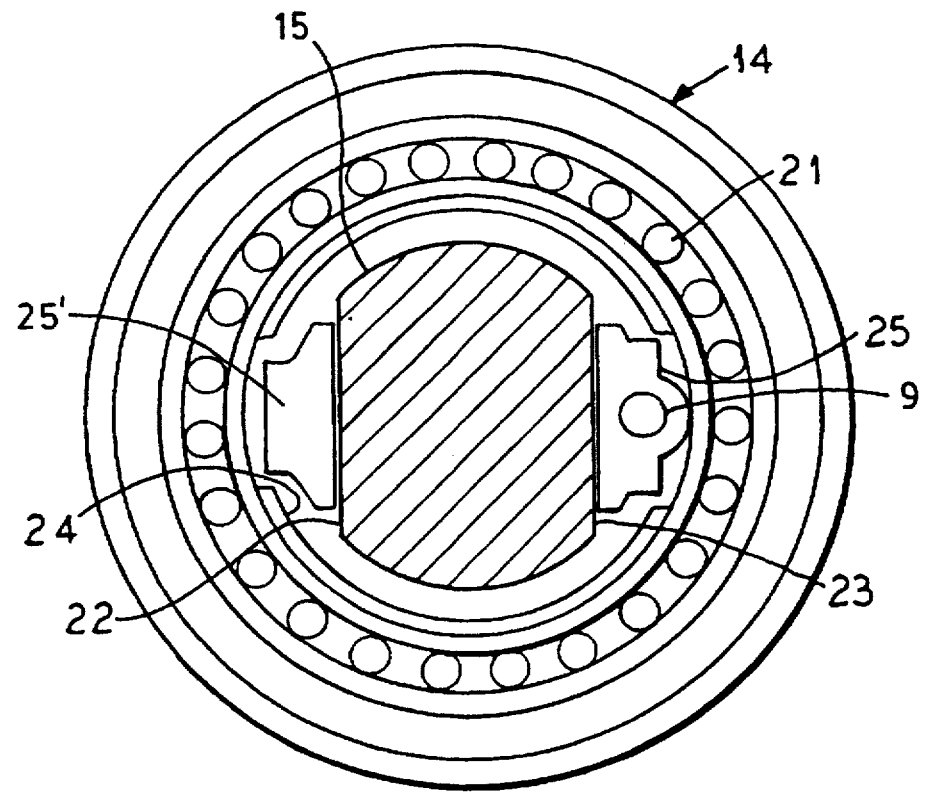
FIG. 2 is a sectional view taken substantially along line II—II of FIG. 1.

As illustrated in FIGS. 1 and 2, a controlled deflection roll press assembly includes an upper, mating press roll 11 which is rotatably mounted on a shaft supported in bearings 12 and 13.

A lower, controlled deflection roll 10 forms a nip with the upper press roll. The position of the rolls may in some instances be reversed with the controlled deflection roll 10 being above the mating roll 11.

The controlled deflection roll includes a rotatable shell 14 with a supporting shaft 15 extending axially therethrough. The supporting shaft is non-rotatable but is supported in framework 19,20 by spherical bushings 17,18 to permit bending of the roll 10, and deflection of the support shaft, as it carries the load of applying forces to the nip N between press rolls 10,11.

The nip load is controlled by fluid pressure control means, such as pistons 16 between the roll shell and the shaft 15, which exert an upward force to control the forces in the nip. To an extent, the contour of the nip can also be controlled by this means. At the ends of the roll shell are bearings, shown at 21 at one end with a similar bearing at the opposite end. These bearings maintain the ends of the roll shell in alignment with the shaft and with the nip N.

To ensure that the ends of the roll are maintained in alignment with both the nip and the support center shaft, the bearings at each end of the roll are mounted to a bearing ring 24 which, in turn, is pivotally attached to the center shaft 15 with a pivot pin 9 which is mounted in a pillow block 25. In FIG. 2, the bearing ring is shown broken away for clarity. Each side of the center shaft 15 has a flat surface 22,23, which surfaces are parallel, to facilitate mounting the pillow block 25 at each end of the shaft. On the side of the shaft at each end of the shaft opposite the pillow blocks is a U-shaped guide 25' which engages the bearing ring 24 to guide it in its pivoting path of travel and to provide axial thrust support.

While various forms of nip loading support means may be provided for loading the nip, that is applying a nip loading force to the inner surface of the roll shell 14, one form is shown by a series of hydraulically actuated, hydrostatic shoes 32 arranged at spaced intervals longitudinally on the support shaft in a cross-machine direction and supported on the shaft 15. The shoes may be uniformly loaded or differentially loaded, depending upon the nip contour loading desired.

Figure 3:
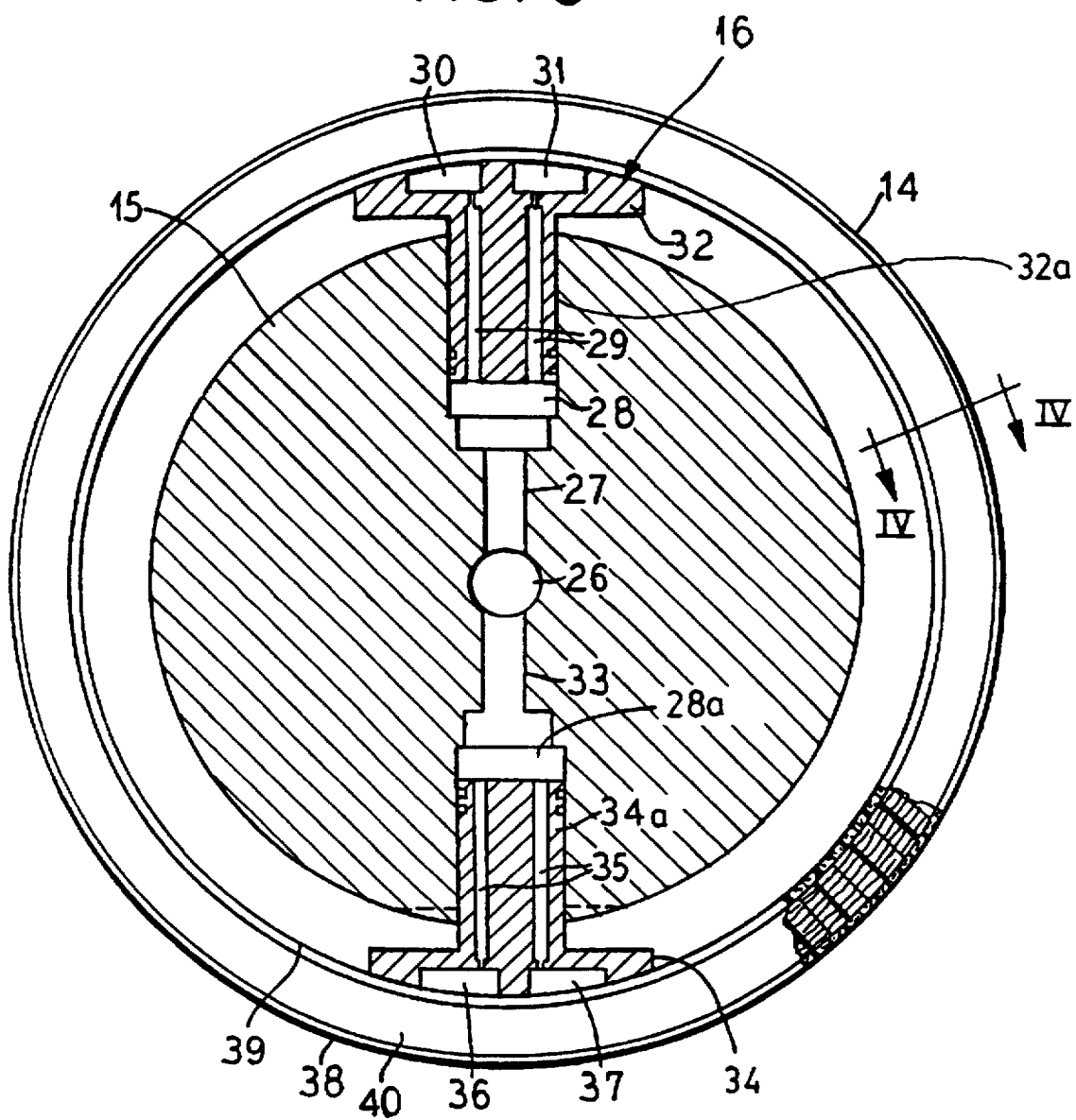
FIG. 3 is a sectional view taken substantially along line III—III of FIG. 1.

Nip loading hydraulic pressure is provided by a hydraulic pump, not shown, which supplies hydraulic fluid, such as oil, through a single center core passage 26, FIG. 3, in the shaft 15, or alternatively, through a series of hydraulic passages, not shown. The center passage 26 has vertically extending individual riser passages 27 which lead to a cylinder chamber 28 beneath the base of each of the pistons 32. These pistons 32 are sometimes referred to as shoes in the papermaking industry. The hydraulic fluid pressure in the chamber 28 urges the shoe 32 upwardly to support the load and, to ensure constant lubrication and hydrostatic fluid support, the hydraulic fluid, under pressure, is channeled upwardly through passages 29, sometimes called capillary tubes, in the piston into pockets 30,31 in the shoe 32 surface facing the inner surface of the roll shell 14.

In some instances, counter-load shoes 34 may be provided. One of the functions of these shoes is to raise the roll shell when the shell is mounted in an inverted position, that is, when the controlled deflection roll is above the plain roll. Other passages 33 lead from the center core passages 26 to a chamber 28a beneath the piston 34a and passages 35 through the piston open into lubrication pockets 36,37 in the face of the shoe 34 facing the inner surface of the roll shell. The fluid transmitted to the pistons 34a is controllable so that it can be used to raise the roll shell and, if used during operation, the pressure is controllable so that the nip loading shoes 32 can perform their function of loading the nip and provide an appropriate nip pressure profile.

Figure 4:
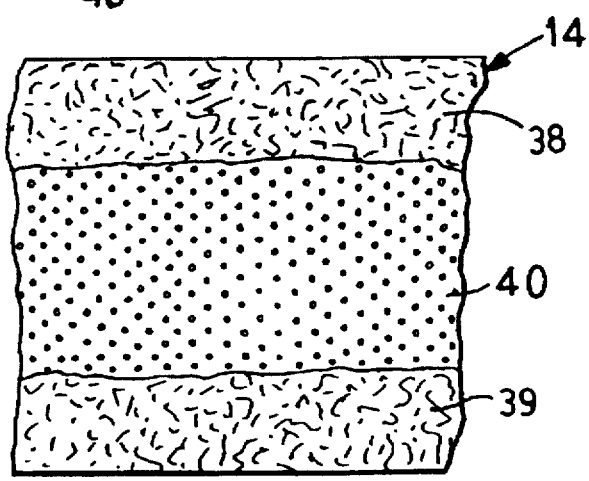
FIG. 4 is an enlarged fragmentary sectional view along the line IV—IV of FIG. 3 showing the construction of the roll shell.

The controlled deflection roll shell 14, as shown in FIGS. 3 and 4, is constructed of a lightweight matrix and fiber composite, preferably multi-layered with concentric annular layers. The roll shell is comprised of a fiber-reinforced matrix, such as epoxy, for example, which will have a total weight of only 20% of the weight of a conventional controlled deflection roll shell of the same thickness, but made of steel. Actually, the weight can be less than 10% of the weight of a normal steel shell if the shell thickness is reduced to a minimum required for mechanical stability. The reduced shell thickness is possible because the shell stresses are predominantly compressive stresses and the composite shell can readily tolerate compressive stresses. The reduced mass will greatly reduce the potential for press nip damage to the felts and roll cover.

The shell is manufactured with reinforcing fibers 40 in an intermediate layer, and these reinforcing embedded fibers are oriented in the circumferential direction, as shown in FIG. 4. This does not add to the cross-machine direction bending stiffness of the shell, but it still increases the hoop stiffness of the shell. This allows the shell to bend more easily and might eliminate the need for counter-acting shoe loadings near the ends of the roll shell. The high hoop stiffness maintains an essentially cylindrical roll shell shape.

Another advantage of this shell construction is the ease of balancing. The shell can be manufactured on a precision smooth mandrel. This eliminates the need to bore the shell. Further, a lower mass results in lower potential imbalance forces.

The composite shell has a naturally higher vibration dampening coefficient. Proper selection of matrices and fibers will provide a chemically inert, wear-resistant, impact-resistant, impermeable shell. Due to inherent structural properties of the matrices (e.g. the ability to transfer stresses between fibers and to provide abrasion resistance), and the fibers (e.g. the ability to provide tensile strength, and to distribute load) in the composites, fatigue failures would not be catastrophic. Fatigue failures will manifest themselves in typically slowly progressive failures.

The composite roll shell has an inner layer 39 of a high abrasion-resistant fiber and a high-temperature, impermeable composite matrix. This inner layer construction is used to minimize shell damage due to oil contaminants or temporary loss of lubrication. Preferred matrix materials for construction of the inner layer are toughened epoxies, urethane, thermoplastic, PEEK, PPS and nylon. Preferred fibers for the inner layer are aramids, ceramic, glass, graphite, para- and meta-aramids. It is preferred to have the inner surface of the inner layer comprised of a matrix material with no fiber material, or very little fiber material exposed.

The center core layer 40 (i.e. the intermediate layer) of the composite shell is comprised of a high strength fiber. This fiber is wound on the inner surface layer with the fibers predominantly oriented in a circumferential direction. This construction develops a high shell stiffness to prevent the shell from distorting out of the circular shape while providing low resistance to roll bending so that the crown or deflection of the roll shell can be easily controlled. Preferred fibers for the center core, or intermediate, layer include aramids, ceramic, glass, graphite, para-aramids and meta-aramids. Preferred matrices for the center core, or intermediate, layer include toughened epoxies, urethane, thermoplastic, PEEK (Poly Ether Ether Ketone), PPS (Poly Phenylene Sulfide) and nylon.

The outer layer 38 of the composite shell comprises a composite of fibers and matrix which provide impact resistance, wear resistance, and a surface which can be routinely ground to maintain the outer surface crown profile. Preferred matrices for the outer layer include toughened epoxies, urethane, thermoplastic, PEEK (Poly Ether Ether Ketone), PPS (Poly Phenylene Sulfide) and nylon. Other matrix materials which are useful and preferred for use in the outer layer are epoxies, polyesters, phenolics, polyamids and bisnalaimides. Preferred fibers for the outer layer include aramids, ceramic, glass, graphite, para-aramids and meta-aramids.

In operation, the nip is closed and a web to be pressed is threaded through the nip N. The shoes are loaded with oil pressure to maintain the desired nip load. The nip loading shoes can be divided or further segmented or controlled as to hydraulic fluid pressure supplied thereto in the cross-machine direction to allow adjustability to the nip pressure profile. The roll shell is rotated at a relatively high speed to accommodate present high speed papermaking machines when the nip is utilized in a dewatering section of a paper machine. The relatively lightweight roll shell is capable of a long operating life and has a relatively low bending stiffness in the cross-machine direction. Because the layers of the shell are chosen to provide a high abrasion resistant composite on the inner surface which also has high temperature resistance, the shell damage due to oil contaminants or temporary loss of lubrication is minimized. With the high hoop strength of the shell, the shell is capable of a long operating life providing an improved function, as well as obtaining a shell which is manufactured without the necessity of providing huge molding facilities and huge machining facilities, such as are necessary with a cast steel shell. Where the steel shell must have an exterior coating of rubber or high release material, the resin which is chosen for the outer surface of the shell can have these features without an additional coating layer, or alternatively, be selected for improved bonding to said coating or material.

Thus, it will be seen there has been provided an improved controlled deflection roll which meets the objectives and advantages above set forth.

We claim as our invention:

1. A controlled deflection roll for forming a press nip with a mating roll, the controlled deflection roll comprising, in combination:

an elongate tubular roll shell;

an elongate support shaft extending longitudinally through the roll shell;

and a fluid operated controllable load support means on the shaft and extending between the shaft and the shell for transmitting load forces from the shaft to the nip;

said roll shell comprising a plurality of annular layers, with an outer layer comprising a composite of fibers embedded randomly in a matrix, the outer layer in supporting relationship opposite the nip, an inner layer comprising a composite of fibers embedded in a matrix, the inner layer having an inner surface comprising at least a matrix in contact with said load support means, and a layer intermediate the inner and outer layers, the intermediate layer comprising a composite of a matrix and embedded strengthening fibers.

2. A controlled deflection roll for forming a press nip constructed in accordance with claim 1, wherein:

said fibers in the intermediate layer extend in a substantially circumferential direction.

3. A controlled deflection roll for forming a press nip constructed in accordance with claim 1, wherein:

said inner layer is comprised of a composite of a high abrasive resistant matrix and fibers.

4. A controlled deflection roll for forming a press nip constructed in accordance with claim 1, wherein:

said inner layer matrix is comprised of a high temperature matrix, with the inner surface of said inner layer formed substantially entirely of matrix material so as to provide improved sliding friction between the shoe and inner surface and impermeability to oil contaminants.

5. A controlled deflection roll for forming a press nip constructed in accordance with claim 1, wherein:

said outer layer is formed of a fiber and matrix composite, which composite is chemically inert, impact-resistance, wear-resistant grindable material.

6. A controlled deflection roll for forming a press nip with a mating roll, the controlled deflection roll comprising, in combination:

an elongate tubular roll shell;

an elongate support shaft extending longitudinally through the roll shell;

and a fluid operated controllable load support means between the shaft and the shell for transmitting load forces from the shaft to the nip;

said roll shell being constructed of a composite of a matrix and fibers, the roll shell having a relatively low modulus of stiffness in a cross-machine direction.

7. A controlled deflection roll for forming a press nip constructed in accordance with claim 6, wherein:

said roll shell is comprised of concentric outer, intermediate and inner layers;

said intermediate layer is comprised of a matrix and fiber composite wherein the fibers are aligned substantially in the circumferential direction; and said inner layer of the shell is formed of a composite of a matrix and fibers, the matrix capable of resisting high temperatures.

8. A controlled deflection roll for forming a press nip with a mating roll, the controlled deflection roll comprising in combination:

an elongate tubular roll shell;

an elongate support shaft extending longitudinally through the roll shell; and a fluid operated controllable load support means between the shaft and the shell for transmitting load forces from the shaft to the nip;

said roll shell being comprised of three concentric layers, an inner, outer and intermediate layer each layer formed of a composite of a matrix and fibers, the fibers in the inner and outer layers being randomly disposed in the matrix, and the fibers in the intermediate layer being substantially circumferentially orientated.

9. A controlled deflection roll for forming a press nip in accordance with claim 8, wherein:

said fibers in at least one of the layers is selected from the group comprising aramids, ceramic, glass, para-aramids and meta-aramids; and said matrix in the said at least one layer is selected from the group comprising epoxy, polyester, phenolics, polyamids, bisnalaimides, toughened epoxy, urethanes, thermoplastics, Poly Ether Ether Ketone, Poly Phenylene Sulfide and nylon.

10. A controlled deflection roll for forming a press nip with a mating roll, the controlled deflection roll comprising, in combination:

an elongate tubular roll shell;

an elongate support shaft extending longitudinally through the roll shell;

and a fluid operated controllable load support means on the shaft and extending between the shaft and the shell for transmitting load forces from the shaft to the nip;

said roll shell having a plurality of annular layers, including an inner layer having a fiber selected for high abrasion resistance and being constructed of a composite comprising a matrix and fibers so that the shell is of relatively light weight and has reduced cross-machine bending stiffness, and wherein at least some of the fibers extend in a substantially circumferential direction.

11. A controlled deflection roll for forming a press nip with a mating roll, the controlled deflection roll comprising, in combination:

an elongate tubular roll shell;

an elongate support shaft extending longitudinally through the roll shell;

and a fluid operated controllable load support means on the shaft and extending between the shaft and the shell for transmitting load forces from the shaft to the nip;

said roll shell having a plurality of annular layers, including an intermediate layer formed of a fiber and matrix composite with the fibers oriented substantially in the circumferential direction so that the shell is of relatively light weight and has reduced cross-machine bending stiffness.

12. A controlled deflection roll for forming a press nip with a mating roll, the controlled deflection roll comprising, in combination:

an elongate tubular roll shell;

an elongate support shaft extending longitudinally through the roll shell;

and a fluid operated controllable load support means on the shaft and extending between the shaft and the shell for transmitting load forces from the shaft to the nip;

said roll shell having a plurality of annular layers, including an outer layer formed of a fiber and matrix composite, which composite is chemically inert, impact-resistant, wear-resistant grindable material so that the shell is of relatively light weight and has reduced cross-machine bending stiffness, and wherein at least some of the fibers extend in a substantially circumferential direction.

* * * * *